Patented July 6, 1937

2,086,217

UNITED STATES PATENT OFFICE 2,086,217

PROCESS FOR BREAKING PETROLEUM EMULSIONS

Melvin De Groote, St. Louis, Mo., assignor to The Tret-O-Lite Company, Webster Groves, Mo., a corporation of Missouri No Drawing. Application January 15, 1937, Serial No. 120,753

10 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated for use in my process is a sulfonation product derived by treating a phosphatide of animal or vegetable origin with a sulfonating agent. Such sulfonation may take place in presence of reactive aromatic or reactive fatty materials. The material obtained by sulfonation may be used in the acidic state or after conversion into a salt or ester. The sulfonation process may produce sulfonic acids, organic sulfates, sulfo-aromatic acids, or the like.

Lipoids are a group of organic substances one division of which is nitrogenous in nature. They are soluble in ether and in the usual fat solvents. They are found in abundance in certain animal tissue and in certain nitrogenous vegetable products. One group of the lipoids which contains both nitrogen and phosphorus are known as phosphatides. Examples of the phosphatides are lecithin, cephalin, and sphengomyelin.

It is well known that phosphatides of vegetable or animal origin have some emulsifying properties and have been used in certain arts as a result of this property. They do not exhibit pronounced demulsifying properties. Phosphatides can be sulfonated or sulfated in various manners. I have found that such sulfonation or sulfation products possess a marked demulsifying action.

Any suitable phosphatide may be employed but it is most desirable to use lecithin and associated materials obtained from soya bean oil, egg products and the like. In view of the increased production of soya bean oil, it appears that the most available low cost phosphatide or lecithin will be the product derived from the soya bean industry. For this reason I prefer to use demulsifying agents obtained from purified soya bean lecithin or soya bean lecithin with its associated cogeners including cephalin. Although soya bean lecithin may be sulfonated in any suitable manner, I prefer to proceed in the manner described in British Patent No. 449,132, dated June 22, 1936, to Stockhausen, or by employing modifications of such procedure, which are characterized by the presence of added reactive aromatic materials.

The following description of the preparation of sulfonated lecithin is taken substantially verbatim from the aforementioned British patent.

As sulfonating agents may be employed the substances known for this purpose, such as concentrated sulfuric acid, sulfuric acid monohydrate, sulfur trioxide, oleum, chlorosulfonic acid as well as mixtures of these substances. It has also been found that to obtain more desirable products the sulfonation agent should be employed in a quantity of at least 60% of the weight of the phosphatide.

The conditions to be maintained during the sulfonation depend on the kind of starting material and sulfonating agent employed. Preferably, the working temperature should not exceed 10° C.

The sulfonation can be carried out in the presence of diluents or solvents such as hydrocarbons, for example benzine or chlorinated hydrocarbons, for example perchlorethylene, trichlorethylene or carbon tetrachloride. The sulfonation can also be assisted by the addition of dehydrating agents, for example anhydrides and chlorides of organic acids, e. g. acetic anhydride, anhydrous sodium sulfate and the like. It is also possible to add to the phosphatides before sulfonation fats, oils or their fatty acids in a quantity which preferably does not exceed the quantity of the phosphatides. The sulfonation products obtained, in contradistinction to the phosphatides themselves frequently dissolve in water to form a clear, or almost clear, solution. The following examples serve to illustrate methods which may be employed to produce suitable demulsifying agents.

*Example 1*

100 parts by weight of soya bean lecithin are dissolved in 250 parts by weight of perchlorethylene and are treated with 100 parts by weight of sulfuric acid monohydrate at a temperature of 0-10° C. After the reaction is complete, the sulfonate is washed with ice water, allowed to separate, and preferably freed from solvent, after neutralization.

Example 2

100 parts by weight of soya lecithin are mixed with 25 parts by weight of acetic anhydride and 100 parts by weight of trichlorethylene and the mixture is treated at a temperature of 0-10° C. with 200 parts by weight of concentrated sulfuric acid. The sulfonation product is worked up in the same way as the product obtained in Example 1.

Example 3

50 parts by weight of soya lecithin are mixed with 50 parts by weight of castor oil fatty acid and 200 parts by weight of benzine, and 120 parts by weight of sulfuric acid monohydrates are introduced at a temperature of from 0-5° C. The sulfonation product is washed with ice water, and allowed to separate.

In addition to the procedure described in the aforementioned British patent, I have found that other valuable sulfonation products are obtainable by following the procedure employed in the manufacture of conventional Twitchell reagents. Conventional Twitchell reagents are obtained by sulfonation of fatty materials in presence of aromatic materials. The products obtained are sulfo-aromatic fatty acids. The sulfo group introduced is in the form of a sulfonic acid radical and is introduced into the aromatic residue. If one follows the procedure outlined in Example 2 above until sulfonation is complete and then adds slowly 35 parts by weight of phenol without permitting an undue rise in temperature and then adds thereafter an additional 100 parts by weight of concentrated sulfuric acid and permits reaction to take place for approximately 3 hours, there is formed a sulfo-aromatic lecithin which is comparable in some respects to a Twitchell reagent. Instead of using phenol one may use any of the aromatic materials employed in the manufacture of Twitchell reagents, such as naphthol, naphthalene, benzene, xylene, cresol, tetralin, etc. I have found demulsifying agents so prepared to be particularly effective. If one makes a similar modification of Example 3 above, the resulting product is characterized by the fact that part of the aromatic material combines with the fatty material to form a true Twitchell reagent, and part combines with the lecithin to produce a chemical compound of the kind just described. The subsequent steps of washing with ice water and neutralization are similar to those described in connection with compounds produced without aromatic materials being present.

It is understood that materials obtained in the manner described above are characterized by the presence, to a greater or lesser degree, of a sulfo acid radical and may be employed in the acidic state or in the form of a salt or in the form of an ester. However, due to the corrosive properties of the acidic material, it is usually desirable to convert such material into a salt or ester. Esterification of such sulfo acids is rather expensive because it is generally necessary to convert a sulfo acid, such as a sulfonic acid, for example, into a sulfonchloride and react the sulfonchloride with a suitable alcohol. From a practical standpoint it is more desirable, therefore, to use these materials in the form of a salt. Free sulfo acids of the kind described may be reacted with any suitable base, such as caustic soda, caustic potash, sodium carbonate, potassium carbonate, ammonium carbonate, ammonium hydroxide or the like, so as to convert the materials into the corresponding salts. Similarly, instead of ammonia one may employ triethanolamine, diethanolamine, benzylamine, cyclohexylamine, monoamylamine, diamylamine, triamylamine, morpholine, or any other suitable amine. Sulfo acids of the kind described above may be reacted with calcium oxide, magnesium oxides, or the like. Similarly, one may produce heavy metal salts, such as iron salts, lead salts, etc. Heavy metal salts and higher molecular weight amine salts are often oil-soluble. In some instances the higher molecular weight amine salts may be oil and water soluble. My preferred demulsifying agent is obtained by use of an alkylolamine, such as triethanolamine, so as to produce a water-soluble salt. As previously stated, one may convert the acids into suitable esters derived from alcohols, such as methyl alcohol, ethyl alcohol, propyl alcohol, butyl alcohol, amyl alcohol, hexyl alcohol, benzyl alcohol, cyclohexanol, cyclobutanol, etc.

My preferred reagent is obtained by neutralizing the acidic material prepared according to Example 3 above, with just sufficient triethanolamine to neutralize all the sulfo acid, that is, to make the material neutral to methyl orange indicator, but so as to leave it still acid to phenolphthalein indicator. The benzine is distilled off and the residual material used as such or after dilution with some suitable solvent of the kind hereinafter described.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc. may be employed as diluents. Similarly, the chemical compound employed as the demulsifying agent of my process may be admixed with one or more of the solvents customarily used in connection with conventional demulsifying agents. Moreover, said chemical compound may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ration of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of my process.

In practising my process a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone or in combination with other demulsifying procedure, such as the electrical dehydration process.

In the specification, reference has been made to various alcohols, amines and the like all of which are sometimes available in more than one isomeric form. Indeed, it may be that the various phosphatides are available in more than one isomeric form. It is understood that the use of this process is not limited to any particular isomeric form in regard to any particular compound or in regard to any particular group or radical entering into the compound. It is understood in the claims that the expression "sulfonation product" includes sulfo acids broadly, that is, acid sulfates, sulfo-aromatic acids and sulfonic acids in their various forms, such as the acidic form, the ester form and the salt form.

Having thus described my invention, what I claim as new and desire to secure by Letters Patent is:

1. A process for breaking petroleum emulsions of the water-in-oil type, which consists in subjecting the emulsion to the action of a demulsifying agent comprising a sulfonation product derived from a phosphatide.

2. A process for breaking petroleum emulsions of the water-in-oil type, which consists in subjecting the emulsion to the action of a demulsifying agent comprising a sulfonation product derived from a vegetable lecithin.

3. A process for breaking petroleum emulsions of the water-in-oil type, which consists in subjecting the emulsion to the action of a demulsifying agent comprising a sulfonation product derived from soya bean lecithin.

4. A process for breaking petroleum emulsions of the water-in-oil type, which consists in subjecting the emulsion to the action of a demulsifying agent comprising a sulfonation product derived from soya bean lecithin, and characterized by being in the form of an ester.

5. A process for breaking petroleum emulsions of the water-in-oil type, which consists in subjecting the emulsion to the action of a demulsifying agent comprising a sulfonation product derived from soya bean lecithin, and characterized by being in the form of an acid.

6. A process for breaking petroleum emulsions of the water-in-oil type, which consists in subjecting the emulsion to the action of a demulsifying agent comprising a sulfonation product derived from soya bean lecithin, and characterized by being in the form of a salt.

7. A process for breaking petroleum emulsions of the water-in-oil type, which consists in subjecting the emulsion to the action of a demulsifying agent comprising a sulfonation product derived from soya bean lecithin, and characterized by being in the form of an amine salt.

8. A process for breaking petroleum emulsions of the water-in-oil type, which consists in subjecting the emulsion to the action of a demulsifying agent comprising a sulfonation product derived from soya bean lecithin, and characterized by being in the form of a water-soluble amine salt.

9. A process for breaking petroleum emulsions of the water-in-oil type, which consists in subjecting the emulsion to the action of a demulsifying agent comprising a sulfonation product derived from soya bean lecithin, and characterized by being in the form of a water-soluble triethanolamine salt.

10. A process for breaking petroleum emulsions of the water-in-oil type, which consists in subjecting the emulsion to the action of a demulsifying agent comprising a mixture of sulfo fatty materials and a sulfonation product derived from soya bean lecithin, and characterized by being in the form of a water-soluble amine salt.

MELVIN DE GROOTE.